Oct. 7, 1969

W. RICHTER 3,470,726

DIE SET

Filed May 29, 1968

INVENTOR.
Walter Richter
BY
Irving Seidman
ATTORNEY

Oct. 7, 1969 W. RICHTER 3,470,726
DIE SET
Filed May 29, 1968 5 Sheets-Sheet 2

Oct. 7, 1969  W. RICHTER  3,470,726
DIE SET
Filed May 29, 1968  5 Sheets-Sheet 3

W. RICHTER 3,470,726

DIE SET

Filed May 29, 1968

Oct. 7, 1969  W. RICHTER  3,470,726
DIE SET
Filed May 29, 1968  5 Sheets-Sheet 5

United States Patent Office 3,470,726
Patented Oct. 7, 1969

3,470,726
DIE SET
Walter Richter, Syosset, N.Y., assignor to Hudson Machine & Tool Corporation, Farmingdale, N.Y.
Continuation-in-part of application Ser. No. 495,178, Oct. 12, 1965. This application May 29, 1968, Ser. No. 733,077
Int. Cl. B21d 22/00, 43/02; B26d 5/20
U.S. Cl. 72—361                                   22 Claims

ABSTRACT OF THE DISCLOSURE

A die set having a station for forming a workpiece and generally including a first die adapted to be held stationary by a press and a second die adapted to be cyclically moved by the press toward and away from the first die. The first die has a feeder bar mounted thereon which is endwise movable and arranged to move the workpiece forwardly as the feeder bar moves forwardly whereas the second die has a feeder bar actuator connected thereto which coacts with the feeder bar to move the feeder bar forwardly during each cycle of the press. The feeder bar is preferably returned rearwardly during each cycle of the press by a spring. In addition, the actuator is movably connected to the second die and provision made for moving the actuator in the direction of travel of the feeder bar. The actuator, in turn, forwardly carries the feeder bar a distance in excess of the distance it is moved due to the aforesaid coaction with the actuator. The actuator may be returned rearwardly by the same spring which returns the feeder bar.

CROSS-REFERENCE

This application is a continuation-in-part of my prior filed copending application Ser. No. 495,178, filed in the United States Patent Office Oct. 12, 1965, now Patent No. 3,417,596.

BACKGROUND AND SUMMARY OF THE INVENTION

A plurality of substantially uniformly dimensioned collared openings may be formed in a thin sheet of metallic material by lengthwise feeding the material to a cyclically operated press equipped with a die for sequentially forming the openings. Collared openings have been formed in aluminum or copper sheet by this method to fabricate fins for use as radiating surfaces in home heating units such as the units described in U.S. Patent No. 2,963,276. In forming such fins it is not uncommon to operate the die press at the rate of 400 cycles per minute while automatically feeding the sheet material through a progressive die; for example, a die having a series of stations, an opening being formed at a first die station and shaped at a second die station, and so on, to the last die station. To efficiently use such a die, provision must be made for precisely advancing the material from die station to die station between forming operations. In the example given, the object would be to align the opening formed at the first die station with the shaping device at the second and so on. An arrangement for precisely advancing material lengthwise through a progressive die in predetermined equal increments of length is set forth in my copending application Ser. No. 495,178, filed Oct. 12, 1965.

The aforementioned copending application generally describes a feeder bar endwise reciprocable on a fixed die plate for repeatedly advancing the workpiece a precise distance, and a feeder bar actuator carried by a movable die plate toward and away from the fixed die. The direction of travel of the actuator is substantially perpendicular to that of the feeder bar, and the actuator is provided with a camming surface for engaging a roller mounted on a shaft extending from the feeder bar to actuate the feeder bar. The maximum distance the actuator may move the feeder bar in any given cycle of operation is limited by the length of stroke of the press with which the dies are associated, if it is assumed that the depth of the actuator as measured in the direction of travel of the feeder bar is maximized and the angle the actuator cam surface subtends from a line drawn parallel to the depth of the actuator is made as small as is possible without overloading the feeder bar roller shaft while at the same time as large as is necessary to overcome the feeder bar's resistance to motion.

In practice, when the die plates are adapted to a press having a two inch stroke, the actuator cam angle can be made no smaller than approximately 25° and the maximum distance the actuator can advance the feeder bar during a stroke of the press is approximately 5″. Accordingly, the workpiece cannot be advanced more than 5″ per stroke in a 2″ stroke press. To make a greater advancement the dies must be adapted to a press having a greater length of stroke. This invention is concerned with obviating the necessity to do so by providing a method and apparatus for advancing a workpiece a greater distance than it could ordinarily be advanced between forming operations in a press having a given length of stroke. In addition there is provided an arrangement for advancing the workpiece different distances using the same dies.

Assuming the actuator has a camming surface for engaging a cam follower connected to the feeder bar the improvement comprises connecting the actuator to the movable die such that the actuator is movable in the direction of travel of the feeder bar and providing means for moving the actuator in that direction. The means for so moving the actuator preferably comprises an additional camming surface on the actuator which engages a cam follower connected to the fixed die. As the press operates, the second camming surface coacts with its cam follower and the actuator moves a distance defined by the second camming surface. The actuator, in turn, moves the feeder bar the same distance. Thus the feeder bar moves the distance determined by both the first and second camming surfaces. To move the feeder bar different distances provision is made for immobilizing the actuator thereby preventing the added camming surface from coacting with its cam follower. Preferably, the immobilizing means is a gag connected to the movable die which is operable as a stop which blocks actuator motion in the direction of travel of the feeder bar.

DESCRIPTION OF THE PREFERRED EMBODIMENTS

Figure 1:
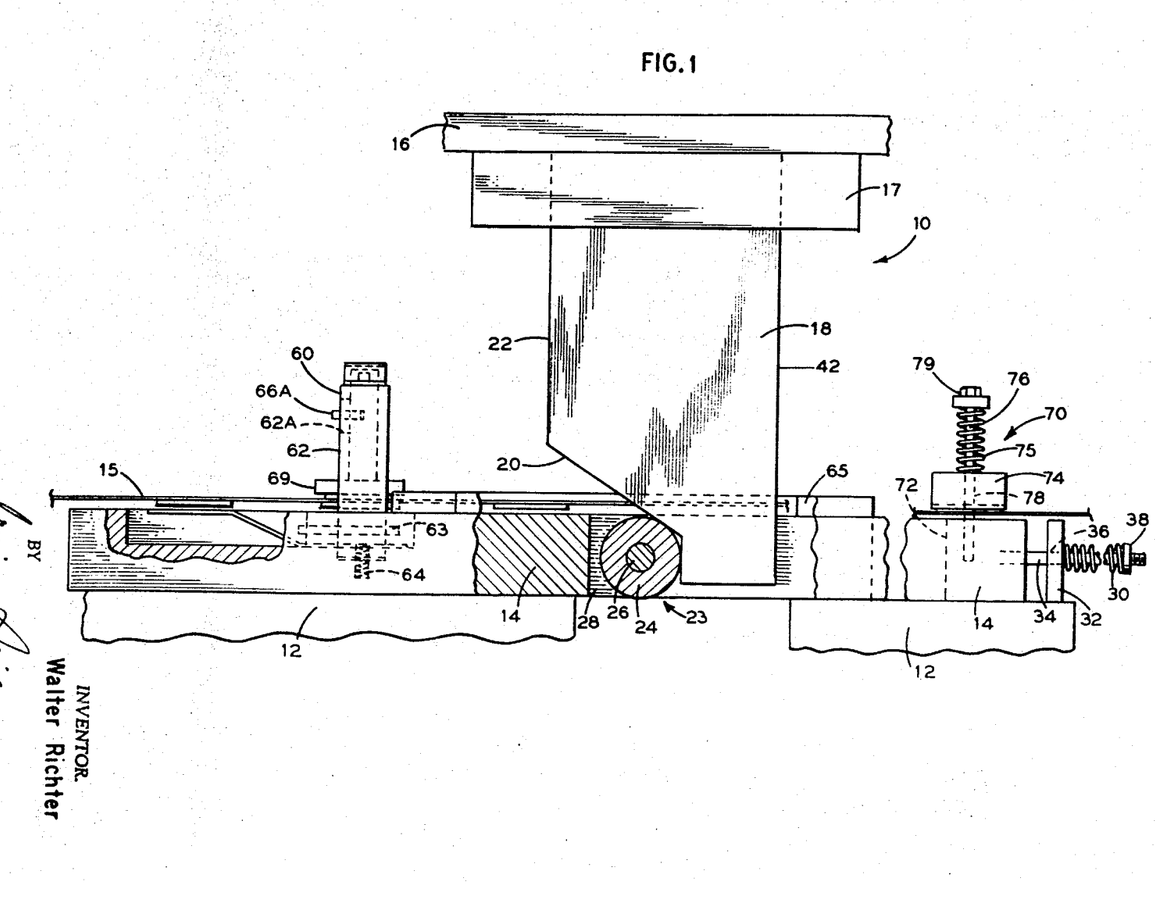
FIG. 1 is a fragmentary side elevation of a die set having some parts thereof shown in section.

Referring now to the drawings wherein like reference characters designate like or corresponding parts throughout the several views, there is shown in FIG. 1 a die set 10 adapted to be associated with a vertically oriented press (not shown). The die set 10 generally includes a fixed lower die plate 12 mounted on the press to act as a platform for a feeder bar 14 which is endwise horizontally reciprocable for moving the workpiece 15 in the desired direction of travel, and an upper die plate 16 connected to the ram of the press by means of a bracing bar 17 to act as a support for a feeder bar actuator 18 carried by the upper plate toward and away from the lower plate. Since the press ram is vertically reciprocable, the direction of travel of the actuator 18 is perpendicular to that of the feeder bar 14.

As is more fully described in my copending application hereinbefore cited, the vertical motion of the actuator 18 is translated to horizontal feeder bar motion through the combination of a cam face 20 formed in the forward surface 22 of the actuator 18, and a cam follower 23 carried by the feeder bar, the preferred cam follower being a roller 24 mounted on a shaft 26 extending from the feeder bar across a slot 28 formed in the feeder bar to receive the actuator 18. As the actuator 18 is moved downwardly into the slot 28, the cam face 20 turns the roller 24 on the shaft 26 to forwardly move the feeder bar 14. The feeder bar roller 24 is spring loaded towards the rear and against the forward surface 22 of the actuator 18 by a spring 30 which is compressed against a fixedly mounted spring stopping element 32 as the feeder bar is moved forwardly by the actuator. The rearward end of the feeder bar is connected to the spring 30 via a rod 34 extending from the feeder bar through an opening 36 in the stopping element 32 and axially of the spring 30 to a spring adjustment collar 38 which caps the end of the spring remote from the stop 32 and is threadably connected to the rod 34. In operation, as the actuator 18 is moved upwardly out of the slot 28, the roller 24, now turning in the opposite direction on the shaft 26, tracks the cam face 20 as the feeder bar is rearwardly returned by the expanding spring 30.

Figures 2, 3:
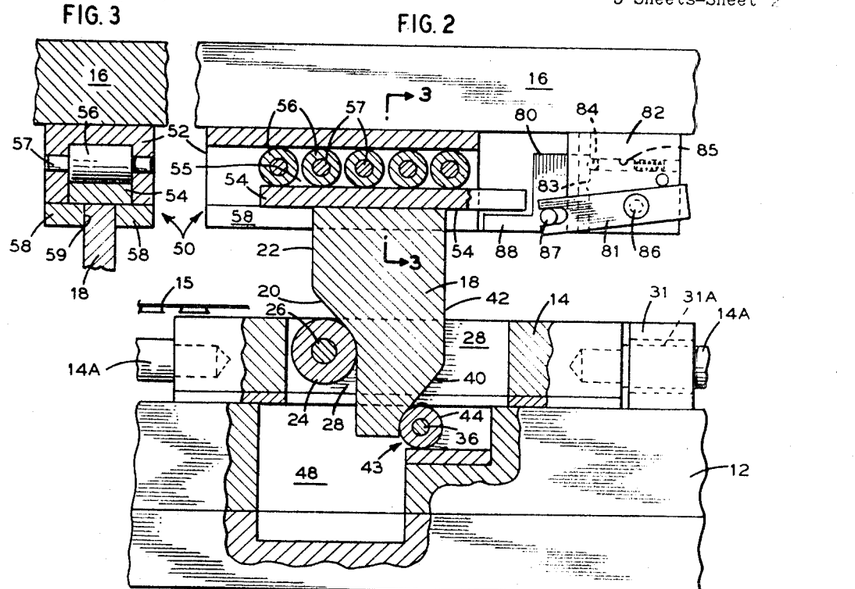
FIG. 2 is a fragmentary side elevation of another die set with some parts thereof shown in section.
FIG. 3 is a partial end view of the die set shown in FIG. 2, taken substantially along the line 3—3 of FIG. 2.

It should be appreciated that with the foregoing arrangement the feeder bar roller shaft 26 is subjected to the most stress when the angle cam face 20 subtends with respect to the depth of the actuator is least, the depth of the actuator being the maximum distance between the forward and rearward surfaces 22, 42 of the actuator as measured along a line drawn parallel to the direction of motion of the feeder bar. As shown in FIG. 2 it is a feature of this invention to reduce the mechanical stress on the feeder bar roller shaft 26 by connecting the feeder bar actuator 18 to the upper die plate 16 for horizontal reciprocation, forming an additional cam face 40 in the rearward surface 42 of the actuator 18, and adding a cam follower 43 on the fixed lower die plate 12 with which the rearward cam face 40 cooperates to horizontally reciprocate the actuator.

For the purpose of the following discussion it is assumed that the depth of the actuator has been predetermined. Ordinarily, the maximum depth of the actuator is limited by the length of stroke of the press to which the die set is adapted.

As best shown in FIGS. 2 and 3, the actuator 18 is reciprocably carried beneath the upper die plate 16 by means of a sliding bearing type of interconnection 50 between them, the fixed portion 52 of the interconnection being associated with the upper die plate 16 and the movable portion 54 being associated with the actuator 18. The fixed and movable portions 52, 54, respectively comprise an open-ended elongated channel member of inverted U-shaped cross-section connected to the upper die plate to define a passageway 55 parallel to the direction of travel of the feeder bar, and an elongated slide bar connected to the upper end of the actuator 18. The slide bar 54 is endwise slidable in the passageway 55 for carrying the actuator in the direction of travel of the feeder bar. A plurality of thrust rollers 56 located within the passageway and in rolling contact with the upper surface of the slide bar 54 are mounted on shafts 57 extending across the passageway from the side walls of the channel 52. The lower end of the channel 52 is formed by a pair of elongated substantially parallel plates 58 extending laterally from the side walls of the channel to form an elongated lower opening 59 into the passageway 55. The plates 58 act as rails or guideways upon which the slide bar 54 is lengthwise seated. As the slide bar moves, its lower surface is held in sliding contact with the guide plates 58 by the thrust rollers 56, the rollers turning in one direction or the other depending on the direction of motion of the slide bar. Since the actuator extends downwardly from the lower surface of the slide bar and through the passageway opening 59 it is guided for motion in the direction of travel of the feeder bar by the plate 58.

The rear cam face 40 is formed in the rearward surface 42 of the actuator 18 to cooperate with the cam follower 43 associated with the fixed lower die plate 12. The cam follower 43 preferably comprises a roller 44 mounted on a shaft 36 extending from the fixed lower die plate 12 across a slot 48 formed in the lower die plate 12 to receive the actuator 18. The lower die plate roller 44 is rotated in place on the shaft 36 by the actuator as it moves upwardly and downwardly in the slot 48, the rearward cam face 40 coacting with the roller 44 to horizontally move the actuator.

Figure 4:
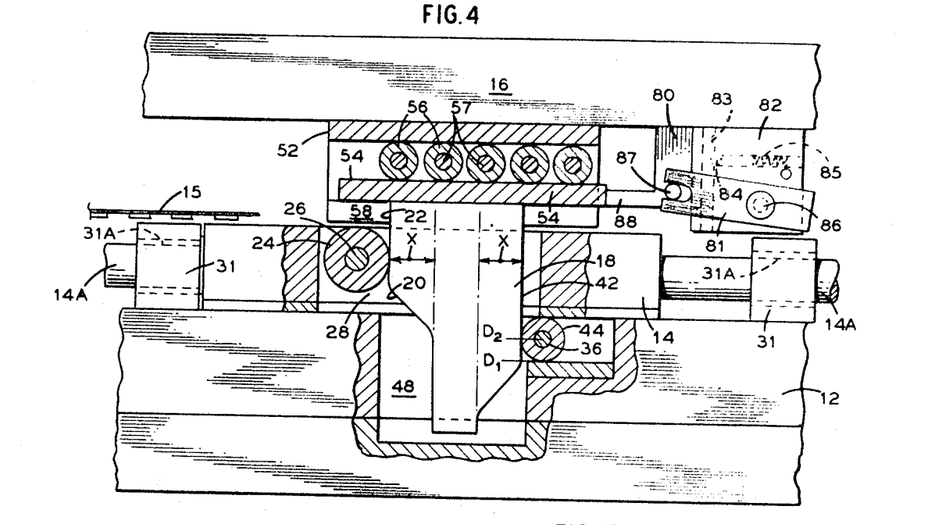
FIG. 4 is a fragmentary side elevation of the die set shown in FIG. 2 with the feeder bar actuator moved downwardly.

In operation, as the actuator moves downwardly into the lower die plate slot 48 the rearward cam face 40 turns the lower die plate roller 44 on its shaft 46 for forwardly moving the actuator 18. Since the actuator is in contact with the feeder bar roller 24, as the actuator moves forwardly the feeder bar is moved forwardly. FIG. 4 shows the actuator 18 fully moved downwardly. As hereinbefore described in connection with FIG. 1, the feeder bar roller 24 is spring loaded towards the rear against the forward surface 22 of the actuator by the spring 30. Consequently, the rearward surface 42 of the actuator is urged towards the rear against the lower die plate roller 44. As the actuator moves upwardly out of the lower die plate slot 48, the feeder bar is rearwardly returned by the expanding spring 30. The rearwardly moving feeder bar carries the actuator rearwardly. Thereupon the actuator causes the die plate roller 44 to turn in the opposite direction on its shaft 46 and track the rearward cam face 40. While these operations are in progress the feeder bar causes the feeder bar roller 24 to track the forward cam face 20 as hereinbefore described to further return the feeder bar.

The arrangement allows the angle the forward cam face 20 subtends with respect to the depth of the actuator to be increased to relieve stress on the feeder bar roller shaft 26, the feeder bar motion lost thereby being made up for by the addition of the rearward cam face 40 and the stress being absorbed by the die plate roller shaft 46. Additionally, it should be appreciated that the depth of the actuator may be increased for correspondingly increasing the distance the workpiece is advanced, and the forward and rearward cam faces of the actuator may be vertically spaced apart from one another when they are formed in the actuator surfaces to move the feeder bar in two distinct sequential steps rather than in a single continuous step. The arrangement thus lends itself to more complex forming operations at the option of the user.

Figure 5:
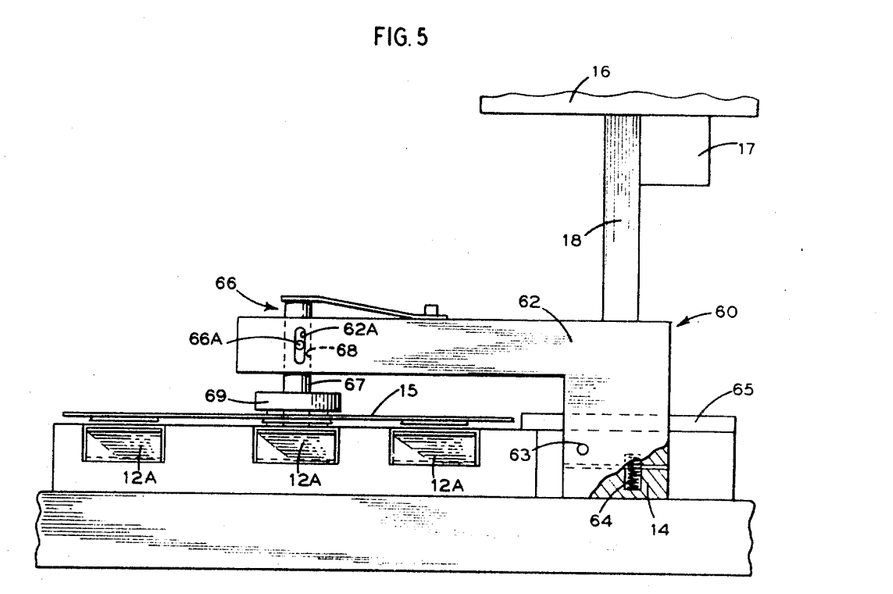
FIG. 5 is an end view of the die set shown in FIG. 1.

With the improved arrangement, the feeder bar is fully advanced forwardly as the ram of the press moves downwardly and fully returned rearwardly as the ram moves upwardly. As shown in FIG. 4, the forward cam face 20 coacts with the forward cam follower 23 to advance the feeder bar "X" inches and the rearward cam face 40 coacts with the rearward cam follower 43 to advance the feeder bar an additional "X" inches; a total advancement of 2X inches during the downward stroke of the ram. The spring 30 described in connection with FIG. 1 returns the feeder bar 2X inches during the upward stroke. As shown in FIGS. 1 and 5, to transmit forward feeder bar motion to the workpiece 15, a material carrier 60 is connected to the forward end of the feeder bar for engaging the workpiece. The carrier 60 repeatedly engages the workpiece to advance the workpiece the same distance the feeder bar is forwardly moved, and disengages the workpiece when the feeder bar is rearwardly moved.

As best shown in FIG. 5, the carrier 60 basically includes an arm 62 connected to the forward end of the feeder bar 14 such that the arm overhangs the workpiece 15. The overhanging portion of the arm 62 is equipped with a feed finger 66 which repeatedly engages the workpiece to move the same when the feeder bar moves forwardly and repeatedly disengages the workpiece when the feeder bar moves rearwardly.

Figure 6:
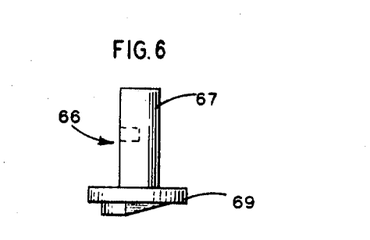
FIG. 6 is a side elevation of a feed finger.
Figure 7:
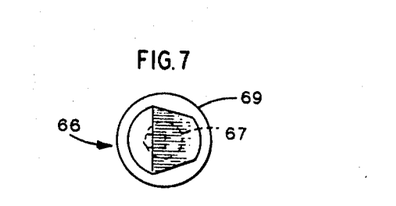
FIG. 7 is a bottom plan view of the feed finger in FIG. 6.

In the embodiment shown in FIG. 5, the arm 62 is preferably pivoted to the feeder bar by means of a pivot pin 63 having one end anchored to the arm 62 or the feeder bar 14, and the other end rotatably mounted in the member 62 or 14 to which it is not anchored. A spring 64 is mounted at the feeder bar end 61 of the arm for urging the feed finger end of the arm towards the workpiece. As shown in FIGS. 5, 6 and 7, the feed finger 66 preferably comprises an elongated body portion 67 terminated by a shaped lower end portion 69. The body portion 67 is resiliently mounted for endwise motion in a bore 68 formed in the overhanging portion of the arm 62 from the side of the arm next adjacent the workpiece, and the lower end portion 69 is shraped to fit a part of the workpiece formed by the die set; in this case, an opening formed in the workpiece at a previous die station. In operation the lower end portion 69 repeatedly engages the rim of the opening to forwardly pull the workpiece when the feeder bar moves forwardly, and repeatedly cams itself out of the opening thereby disengaging the workpiece when the feeder bar moves rearwardly. The feed finger 66 is constrained to prevent its rotation in place by a pin 66A which laterally extends from the upper end portion and rides in a slot 62A formed in the arm 62. Further, a spring 12A, or plurality of springs 12A, may be mounted on the fixed lower die plate beneath the workpiece to urge the workpiece upwardly towards the feed finger, insuring proper engagement and disengagement therebetween.

Other embodiments are shown in my copending application hereinbefore cited. For example, the arm 62 may extend between the forward ends of a pair of feeder bars sidewise spaced apart from one another and operated in unison with one another by similarly spaced feeder bar actuators. In this case it is desirable to fixedly mount the arm on the forward end of each of the feeder bars and eliminate the pivot arrangement hereinbefore described. As further described in the copending application, it may be desirable to add actuator extensions to the forward and/or rearward surfaces of the feeder bar actuator or shims intermediate the end of the feeder bar 14 and the arm 62 to provide for a feed finger drop-in distance of, say, 50 thousandths of an inch, the drop in distance being in excess of the distance the workpiece is moved. Still further, the depth of the forward cam face may be increased by use of shims to form a drop-in distance as an alternative to using shims at the end of the feeder bar. In any event, the feeder bar is not moved forwardly the drop-in distance. This distance is solely provided to allow the lower end portion of the feed finger to overrun the workpiece a distance slightly in excess of 2X inches as the feeder bar actuator moves rearwardly so that the feed finger drops into the opening in the workpiece. In practice, the feeder bar is forwardly moved the drop-in distance before the lower end portion of the feeder finger contacts the rim of the opening to carry the workpiece forwardly. It is understood, of course, that the workpiece is automatically formed by the dies after being moved, the dies being provided with means well known in the art for drawing and/or piercing operations.

In any of the embodiments of the invention it may be desirable to provide a material brake 70 at the rearward end of the die set 10 as shown in FIG. 1 for exerting a holding force on the workpiece to partially resist the pulling force of the feeder bar finger 65, thus insuring accurate displacement of the workpiece from die station to die station. The brake 70 comprises a lower member 72 fixedly mounted on the lower die plate 12 or a stationary part of the press, and an upper member 74 movably connected to the lower member by a spring 75 and guide member 76 arrangement which spring loads the upper member 74 downwardly towards the lower member 72. The guide member 70 is mounted on the lower member 72 and extends upwardly from the lower member through an opening 78 in the upper member 76 and then axially of the spring 75 to a spring adjustment collar 79. The spring adjustment collar 79 caps the end of the spring remote from the collar 79 and is threadably connected to the guide member 76. Since the workpiece is fed between the lower and upper brake members 72, 74, they respectively contact the lower and upper surfaces of the workpiece and exert a holding force on the workpiece which may be increased or decreased by manipulating the brake adjustment collar 79.

In any of the embodiments herein described, or referred to, the length of stroke of a particular press may be somewhat reduced when a die set is adapted to the press since the die set may take up sufficient space in the line of travel of the ram to foreshorten the available length of stroke. For example, in mounting the inventive die set on a press the feeder bar extends above a horizontal plane described by the uppermost surface of the lower die plate and is positioned below the ram of the press. If the portion of the press upon which the lower die plate is mounted cannot be dropped to allow the entire length of stroke of the ram to be utilized, the vertically extending dimension of the feeder bar will foreshorten the length of stroke. In order to mount the feeder bar beneath the ram of the press without still further reducing the available length of stroke as would occur if the plate 65 shown FIGS. 1 and 5 were utilized to encase the upper surface of the feeder bar, it is a feature of the invention to provide a feeder bar mounting arrangement which does not itself interfere with the length of stroke of the press. In any of the embodiments herein described it may thus be desirable to eliminate the encasement plate 65 and provide a pair of pillow blocks 31 in lieu thereof as shown in FIG. 4. The pillow blocks 31 are spaced apart from one another and mounted on the lower die plate to support the ends of the feeder bar. In this arangement the end portions 14A of the feeder bar forwardly and rearwardly of the slot 28 are of reduced cross-section as compared to the portion of the feeder bar in the vicinity of the slot, and each of the pillow blocks 31 is bored to receive one of the ends of the feeder bar to act as a guide therefor. With this arrangement the feeder bar is both supported by the pillow blocks and is endwise slidable therein. The pillow blocks may be provided with bearings 31A to minimize sliding friction without departing from the spirit and scope of the invention. It should be appreciated that the vertically extending dimension of the pillow blocks may be made the same or less than that of the feeder bar to avoid foreshortening the available length of stroke of the ram. The material carrier, brake and spring return means may be connected as hereinbefore described, or referred to, to the end portions 14A of the feeder bar.

In any of the embodiments herein described, or referred to, it should be appreciated that the depth of the rearward cam face (X inches) may be increased or decreased with respect to the depth of the forward cam face (X inches), without departing from the spirit and scope of the invention. The distances are shown and described as being equal to one another to illustrate the inventive subject matter and not for the purpose of limiting the same.

Figure 8:
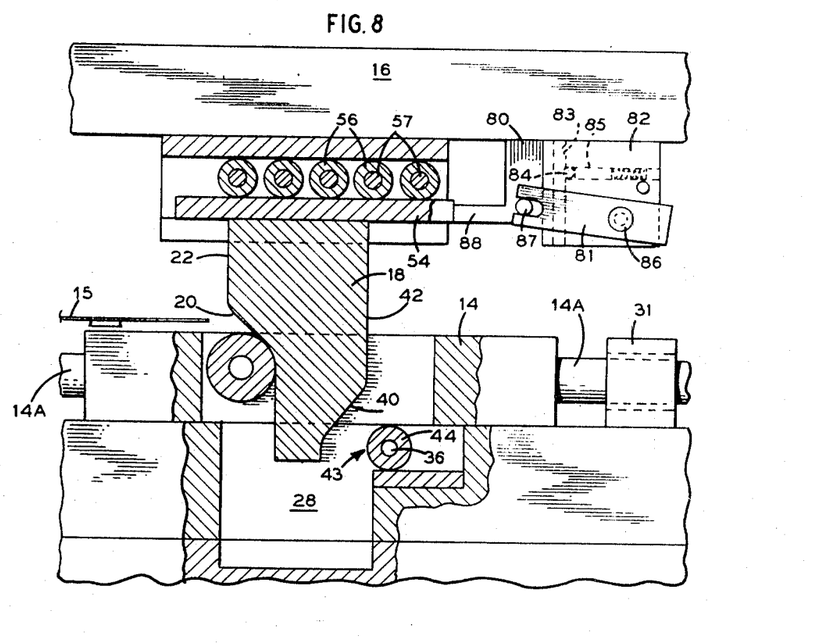
FIG. 8 is a fragmentary side elevation of the die set shown in FIGS. 2 and 4 with gag plate moved upwardly.

With the arrangements hereinbefore described a plurality of collared openings may for example be sequentially formed in sheet material at intervals between successive 2X inch advancements of the material to form radiating fins for home heating units. The collared openings may be spaced apart from one another either 2X inches or a fraction of the 2X inch distance if more than one is to be formed simultaneously, but in any event the spaces between adjacent collared openings along the longitudinal length of the material would be the same. A combination of X and 2X inch advancements is not possible with the arrangement described. However, it is another feature of the invention to allow for such a contingency by providing means for selectively arresting the forward and/or rearward motion of the actuator. It should be appreciated that if the actuator is immobilized the rearward cam face and lower die plate roller will no longer coact with one another. Accordingly, it is a feature of the invention to provide a method and means for selectively preventing the rearward cam face 40 and cam follower 43 from coacting with one another. A preferred embodiment of the feature is shown in FIGS. 2, 4, and 8 and generally comprises a gag member 80 which is movably connected to the fixed upper die plate 16 with provision for motion between a first position shown in FIG. 2 wherein the gag member 80 allows rearward motion of the actuator 18 and a second position shown in FIG. 8 wherein the gag member 80 prevents rearward motion of the actuator. A gag actuator 81, also movably connected to the upper die plate, is cooperatively associated with the gag member 80 to move it from the first position to the second position and cyclically between these positions.

In the preferred embodiment, the gag member 80 is a plate slidably mounted on a carrier block 82 which is pendantly supported by the upper die plate 16 rearwardly of the feeder bar actuator 18. It is seen that the interface between the gag plate 80 and the carrier block 82 is vertically oriented, and the interface surface of the gag plate is provided with a pair of cavities 83 vertically spaced apart from one another a distance equal to the distance between the first and second positions of the gag plate 80. The cavities 83 act as sockets for a spring loaded detent ball 84 mounted in a bore 85 which extends into the carrier block 82 from the interface surface of the block 82. The detent ball 84 is seen to be a part of a detent system comprising the ball 84, a pressure pin, spring, and adjustable retaining screw; all well known in the art. The gag actuator 81 is an elongated member pivoted to the carrier block 82 and movably connected to the gag plate 80 for raising and lowering the gag plate between its two positions. In the preferred embodiment the gag actuator 81 is mounted on a pivot 86 which laterally extends from the carrier block 82 and carries the gag actuator such that portions of the longitudinal length of the gag actuator 81 extend both forwardly and rearwardly of the pivot 86. One end of the gag actuator 81 is associated with the gag plate 80 and is terminated in a forked configuration for loosely engaging a pin 87 that laterally extends from the gag plate 80. Thus the gag plate may be alternatively raised and lowered by pivoting the gag acutator in one direction or the other about the pivot 86, the forked end of the gag actuator displacing the gag plate via the pin 87. To cooperatively associate the gag plate 80 and feeder bar actuator 16, a portion 88 of the gag plate 80 is formed to extend forwardly toward the feeder bar actuator 18. More particularly, the gag plate portion 88 extends toward the slide bar 54 mounted on the upper end of the feeder bar actuator, and is substantially axially aligned with the slide bar 54 when the gag plate is disposed in its upward or second position as shown in FIG. 8.

In operation, the gag plate is normally disposed in its downward or first position as shown in FIG. 2. Assuming the feeder bar actuator has forwardly moved the sheet material a distance of 2X inches and it is desired to move the material a distance of only X inches on the next succeeding downward stroke of the press: if the gag plate is moved upwardly as shown in FIG. 4 before the feeder bar actuator commences its rearward return, the forward end of the extended portion 88 of the gag plate 80 will be positioned superadjacent the rearward end of the slide bar 54, blocking rearward return of the feeder bar actuator. Consequently, the feeder bar is only returned the distance determined by the contour of the forward cam face, as shown in FIG. 8, when the feeder bar actuator moves upwardly. Further rearward motion of the slide bar 54 is blocked by the gag plate. Accordingly, rearward motion of the feeder bar actuator is foreshortened and the rearward cam face 40 and cam follower 43 are prevented from coacting with one another. Assuming the gag plate is in its upward position: on downward stroke of the ram the feeder bar actuator will only move the workpiece X inches, the forward cam face contour determining the total distance the workpiece is advanced. The gag plate may be left in its upward position for as many press cycles as is desirable to produce a single or plurality of workpiece advancements of X inches. Assuming the feeder bar actuator has completed a forward movement of the feeder bar and it is then desired to move the workpiece a distance of 2X inches on the next succeeding downward stroke of the press: if the gag plate is moved downwardly before the rearward cam face of the feeder bar actuator would ordinarily coact with the rearward cam follower to commence rearward return of the feeder bar actuator, the extended portion of the gag plate will be positioned below the line of travel of the slide 54, as shown in FIG. 2, enabling the feeder bar to be fully returned rearwardly the distance determined by both the forward and rearward cam face contours. On the next succeeding downward stroke of the press the workpiece will be advanced 2X inches by the feeder bar. Accordingly, it is now possible to operate the inventive arrangement such that any combination of material advancements of X and 2X inches may be obtained.

Figures 9, 10, 10A:
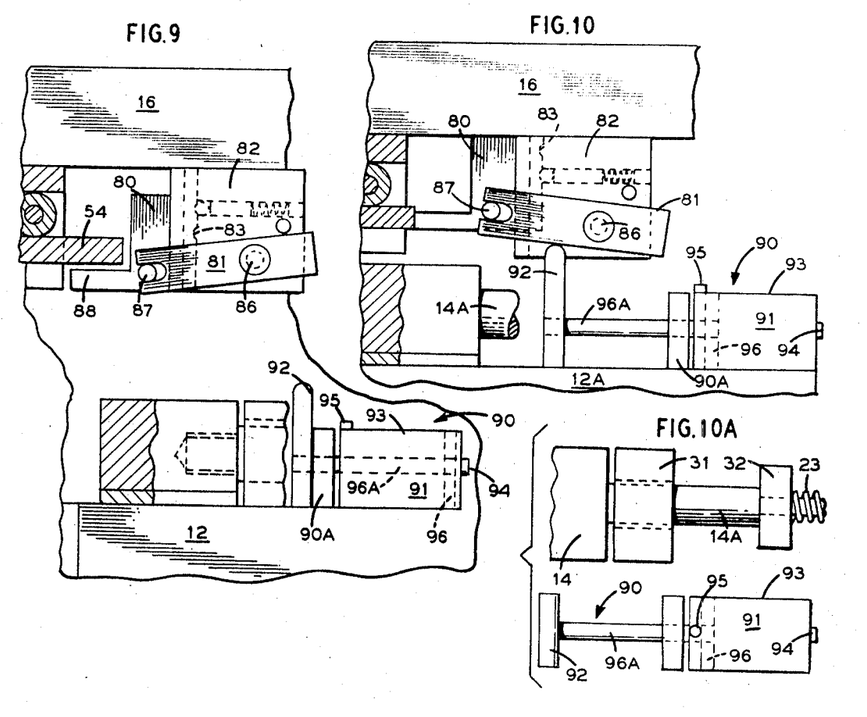
FIG. 9 is a partial fragmentary side elevation of the die set shown in FIG. 8 with the gag plate moved downwardly.
FIG. 10 is a partial fragmentary side elevation similar to FIG. 9 with the gag plate moved upwardly.
FIG. 10A is a fragmentary top plan view of a portion of FIG. 10.

To control the position of the gag plate it is a feature of the invention, as shown in FIGS. 9, 10 and 10A to provide an automatically operated gag plate controller 90 which is adapted to be connected to a motivating source such as a source of compressed air (not shown) and is constructed and arranged to position the gag plate as desired. The controller 90 preferably comprises a two way air cylinder 91 in combination with a gag pin 92 and is mounted on the lower die plate directly beneath the gag actuator 81. The controller 90 may be connected to the lower die plate 12 by means of a mounting plate 90A or other means well known in the art. The air cylinder 91 is constructed and arranged to position the gag pin 92 either forwardly or rearwardly of the gag actuator pivot 86 for rotating the gag actuator in one direction or the other about the pivot. The cylinder 91 includes a housing 93 provided with the usual air ports 94, 95 adapted to be connected to a source of compressed air for motivation of a piston 96 mounted on a shaft 96A extending axially of the housing. One end of the shaft 96A is externally connected to the gag pin 92, which is preferably an upright elongated member oriented beneath the gag actuator.

Ports 94 and 95 alternately act as inlet and exhaust ports for compressed air from the source of air.

In operation, when port 94 is pressurized and port 95 exhausted, the piston will be moved within the housing to carry the shaft and gag pin forwardly, as shown in FIG. 10, and position the gag pin forwardly of the gag actuator pivot 86. Alternatively, when port 95 is pressurized and port 94 exhausted, the piston will be moved rearwardly within the housing, as shown in FIG. 9, carrying the shaft and gag pin rearwardly to position the gag pin rearwardly of the gag actuator pivot. Accordingly, after forward movement of the feeder bar actuator, the gag pin may be positioned to pivot the gag actuator in one direction or the other about its pivot thereby moving the gag plate upwardly or downwardly by alternately pressurizing the ports 94, 95. The rearward cam face coacts with its cam follower on the next succeeding downward stroke of the ram if the gag pin is moved rearwardly and is disabled from doing so if the gag pin is moved forwardly.

To synchronize selectively immobilizing the feeder bar actuator with the motion of the ram of the press, the gag member motion is synchronized therewith. This can be accomplished in one embodiment by synchronizing the operation of the gag plate controller 90 with the motion of the ram of the press. Accordingly, separate features of the invention are to synchronize the forward and rearward motion of the feeder bar actuator with that of the press, or to synchronize the motion of the gag member or gag actuator or controller with that of the press. The latter feature is hereinafter described in detail.

It is a feature of the invention to provide a timing system 100 as shown in FIGS. 11 to 14 for producing a given or any desired sequence of X and 2X inch advancements of the workpiece. The system 100 comprises an electromagneticaly operated air valve 101 which is adapted to selectively interconnect the ports 94, 95 of the gag plate controller to a source of compressed air well known in the art, and a presettable counter 105 which is keyed by the crank of the press and constructed and arranged to operate the air valve 101, the air valve being connected to a source of power 110 for operating the air valve 101 via the counter.

Figure 11:
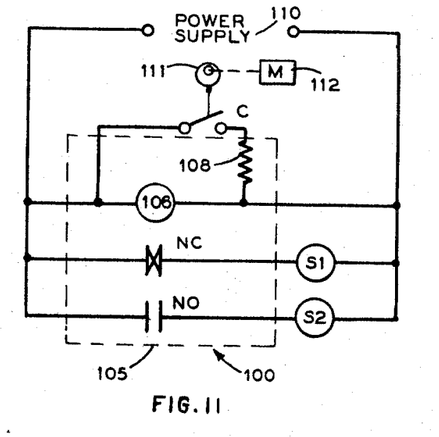
FIG. 11 is a schematic view of a counting circuit.
Figure 12:
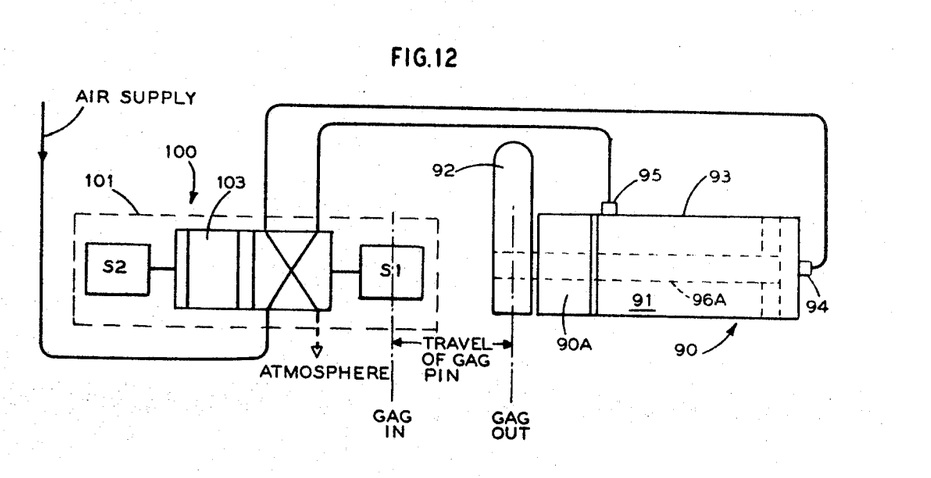
FIG. 12 is a schematic view of a gag plate controller.

The air valve 101 has a four-way two-position valve spool 103 which alternately interconnects one of the air ports 94, 95 of the air cylinder 91 to the source of compressed air and the other to the atmosphere. The valve spool has two solenoid coils associated therewith which are designated S1 and S2 in the drawing. When S1 is energized the valve spool is positioned in the "gag-out" position which corresponds to the position taken by the gag pin to move the gag plate downwardly to its first position, whereas when S2 is energized the valve spool is positioned in the "gag-in" position which corresponds to the position taken by the gag pin to move the gag plate upwardly to its second position.

The counter 105 may be any type of counter well known in the art such as a stepping switch, switching circuit or motorized presettable counter or the like. The basic requirement is that the counter have provision to receive a series of signals and respond upon receipt of a preset number of the signals to alternately energize and de-energize the solenoids S1, S2, only one of the solenoids being energized at any given time. In the preferred embodiment the counter 105 comprises an electromagnet having normally closed and normally open contacts NO and NC. The NC contact is electrically connected in series with the solenoid S1 across the power source 110 and the NO contact is similarly connected with the solenoid S2 across the power source, the series circuits thus being in parallel with one another and the power source. The solenoid 106 of the electromagnet is also connected across the source and is shunted by a circuit comprising a contact C in series with an impedance 108. Contact C is a normally open contact constructed and arranged to be keyed by the press. With each cycle, the press closes and then opens the contact C, pulsing the solenoid 106 of the counter. On receipt of a predetermined number of pulsing signals the counter automatically closes the normally open contact NO and opens the normally closed contact NC for a preset number of revolutions of the crank thus energizing solenoid S1 and deenergizing solenoid S2 for a predetermined number of press cycles. Since solenoid S1 is connected to the source of power 110 through contact NC which corresponds to the gag-out position and 2X inch advancements of the workpiece and solenoid NO is connected to the source of power 110 through contact NO which corresponds to the gag-in position and X inch advancements of the workpiece, the gag pin is thus moved to the gag-in position for X inch advancement of the workpiece for a preset number of press cycles. After the preset number of cycles the counter automatically closes contact NC and opens contact NO, energizing solenoid S2 and de-energizing solenoid S1. The gag pin is thus returned to the gag-out position for 2X inch advancements of the workpiece.

Figure 13:
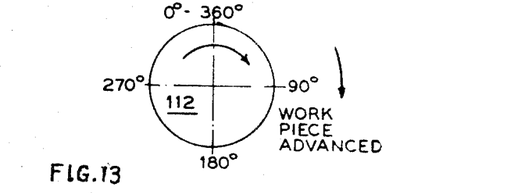
FIG. 13 is a schematic view of a crank.
Figure 14:
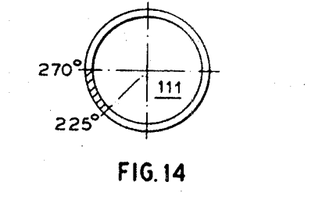
FIG. 14 is a schematic view of a cam.

In the preferred embodiment a cam 111 driven by the crank 112 of the press synchronizes the operation of the ram of the press with that of the gag pin. The cam 111 is positioned with respect to the pulsing contact C such that the contact C is closed and opened during a particular range of degrees of revolution of the crank 112. Referring to FIG. 13, and assuming 0° and 360° correspond to the top dead center position of the ram and 180° corresponds to bottom dead center; with crank rotation considered to be clockwise, the downward stroke of the press occurs in the range of from 0° to 180° and the upward stroke occurs in the range of from 180° to 360°. Since the workpiece is advanced during the downward stroke, it follows that it must be completely advanced as the crank rotates from 0° to 180° whereas the feeder bar actuator must be completely retracted as the crank rotates from 180° to 360°. As hereinbefore described, in order to change the distance the workpiece is advanced on any given downward stroke of the ram, rearward motion of the feeder bar actuator is enabled or disabled while the feeder bar actuator is completely forwardly moved. This may be done either on the downward stroke or the upward stroke so long as the actuator is forwardly moved. The gag plate is also preferably moved when the rearward surface of the feeder bar actuator is not coacting with the rearward cam follower. In the embodiment shown, these conditions are met when the lower die plate roller is contacting the rearward surface of the feeder bar actuator above the rearward cam surface as shown in FIG. 4. In the preferred embodiment the gag pin is moved on the upward stroke of the feeder bar actuator and during the dwell D1–D2 shown in FIG. 4. The pulsing contact C is keyed as the crank moves from 225° to 270° as schematically shown in FIG. 14. In response to a preset number of pulses or counts, the gag pin is moved at substantially 270° and held in the position to which it is moved for at least one complete cycle of the press before being returned at 270° for a desired or any given X–2X combination of advancements of material.

It should be appreciated that the timing system herein described may be more directly utilized to synchronize the motion of the gag member, gag actuator, gag pin, or controller shaft with the motion of the ram of the press, without the use of compressed air, by cooperatively associating the valve spool of the electromagnetic valve directly to one of these elements for actuation by the valve spool. In this case, the spool may be an elongated two position member cooperatively associated with the particular element and arranged to articulate the particular element to disable or enable the feeder bar actuator. For example, the spool could be directly connected to the gag member for moving the gag member upwardly and downwardly. Since the spool is endwise movable it could be oriented vertically and have one end connected to the gag member for moving the same. Likewise, with slight changes in the construction and arrangement of the valve spool, the gag actuator or gag pin or controller shaft may be cooperatively associated with the valve spool for direct operation thereby.

Further, it should be appreciated that the controller may be a hydraulically operated device without departing from the spirit and scope of the invention. In this case, one of the ports 94, 95 would be alternately interconnected by the valve 101 to a source of high pressure fluid while the other was connected to a sump. The timing system would otherwise be substantially as previously described.

What is claimed is:

1. A die set having a station for forming a workpiece, comprising:
   (a) a first die adapted to be fixedly mounted on a press,
   (b) a second die adapted to be connected to the ram of the press and cyclically carried thereby toward and away from the first die,
   (c) a feeder bar which is endwise movably mounted on the first die for forward and rearward motion and is provided with means for moving the workpiece forwardly when the feeder bar moves forwardly,
   (d) a feeder bar actuator which is connected to the second die and moves the feeder bar forwardly during each cycle of the press,
   (e) means for moving the feeder bar rearwardly,
   (f) the feeder bar actuator movably connected to the second die for forward and rearward motion,
   (g) means for moving the feeder bar actuator forwardly to move the feeder bar forwardly,
   (h) means for moving the feeder bar actuator rearwardly to move the feeder bar rearwardly, and
   (i) the dies having provision for forming the workpiece at the die station during each cycle of the press.

2. The die set according to claim 1 including a camming surface formed on the feeder bar actuator, and a cam follower connected to the first die to coact with the camming surface to move the feeder bar forwardly.

3. The die set according to claim 1 including a camming surface formed on the feeder bar actuator, and a cam follower connected to the feeder bar to coact with the camming surface to move the feeder bar forwardly.

4. The die set according to claim 3 including a second camming surface formed on the feeder bar actuator, and a cam follower connected to the first die to coact with the second camming surface to move the feeder bar forwardly.

5. The die set according to claim 1 wherein the means for moving the feeder bar rearwardly includes the means for moving the feeder bar actuator rearwardly.

6. The die set according to claim 1 wherein the means for moving the feeder bar actuator rearwardly includes the means for moving the feeder bar rearwardly.

7. The die set according to claim 1 including first and second camming surfaces formed on the feeder bar actuator, a first cam follower connected to the feeder bar and a second cam follower connected to the first die, one of the camming surfaces coacting with one of the cam followers during each cycle of the press to move the feeder bar forwardly, and the other cam follower coacting with the other cam surface to further move the feeder bar forwardly during at least one cycle of the press.

8. The die set according to claim 1 further comprising,
   (j) means for stopping rearward motion of the feeder bar actuator during at least one cycle of the press.

9. The die set according to claim 7 further comprising,
   (j) means for stopping rearward motion of the feeder bar actuator during at least one cycle of the press.

10. The die set according to claim 9 wherein the stopping means foreshortens rearward motion of the feeder bar during a cycle of the press preceding said at least one cycle of the press to foreshorten forward motion of the feeder bar during said at least one cycle of the press.

11. The die set according to claim 9 wherein the stopping means comprises, a gag member movably connected to the second die for motion between first and second positions, the gag member stopping rearward motion of the feeder bar actuator when it is disposed in one of the positions, and means for moving the gag member from one position to the other.

12. The die set according to claim 11 wherein the means for moving the gag member comprises, a gag actuator movably connected to the second die and cooperatively associated with the gag member for moving the gag member from one position to the other, and means for moving the gag actuator to so move the gag member.

13. The die set according to claim 12 wherein the means for moving the gag actuator comprises, an automatically operated controller mounted on the first die, the controller having a gag pin movable thereby between first and second positions, the first and second positions of the gag member and gag pin corresponding to one another, the gag pin contacting the gag actuator to move the same and thus the gag member from one position to the other, and means for automatically operating the controller.

14. The die set according to claim 13 wherein the means for automatically operating the controller comprises, a timing system keyed by the press, the timing system operating the controller such that the gag member is moved from one of its positions to the other and returned in a predetermined sequence.

15. The die set according to claim 8 wherein the stopping means includes means for synchronizing the motion of the feeder bar actuator with the motion of the ram of the press.

16. The die set according to claim 9 wherein the stopping means includes means for synchronizing the motion of the feeder bar actuator with the motion of the ram of the press.

17. The die set according to claim 11 wherein the means for moving the gag member includes means for synchronizing the motion of the gag member with the motion of the ram of the press.

18. The die set according to claim 12 wherein the means for moving the gag actuator includes means for synchronizing the motion of the gag actuator with the motion of the ram of the press.

19. The die set according to claim 13 wherein the means for automatically operating the controller includes means for synchronizing the motion of the gag pin with the motion of the ram of the press.

20. The die set according to claim 1 wherein the means for moving the workpiece forwardly comprises, an arm connected to the forward end of the feeder bar, and a feed finger carried by the arm, the feed finger engaging the workpiece as the feeder bar moves forwardly to move the workpiece forwardly and disengaging the workpiece as the feeder bar moves rearwardly.

21. The die set according to claim 1 including mounting means for mounting the feeder bar on the first die to avoid foreshortening the available length of stroke of the ram of the press.

22. The die set according to claim 1 further comprising,
(j) means for exerting a holding force on the workpiece to partially resist forward motion of the workpiece.

References Cited

UNITED STATES PATENTS

| | | | |
|---|---|---|---|
| 1,626,977 | 5/1927 | Sibley | 72—36 |
| 2,326,697 | 8/1943 | Stuart | 83—22 |
| 3,138,128 | 6/1964 | Suofy | 113—11 |

RICHARD J. HERBST, Primary Examiner

U.S. Cl. X.R.

72—421; 83—226; 113—113